United States Patent [19]

Kosaka et al.

[11] 4,108,114
[45] Aug. 22, 1978

[54] FUEL REFORMER FOR GENERATING GASEOUS FUEL CONTAINING HYDROGEN AND/OR CARBON MONOXIDE

[75] Inventors: Katuaki Kosaka, Saitama; Zene Ueno, Fuchu, both of Japan

[73] Assignee: Nissan Motor Company, Limited, Japan

[21] Appl. No.: 690,311

[22] Filed: May 26, 1976

[30] Foreign Application Priority Data

May 27, 1975 [JP] Japan .................... 50-62487

[51] Int. Cl.² .......... F02B 43/08; F02B 75/16; F02B 3/00
[52] U.S. Cl. .................. 123/3; 123/32 ST; 123/59 EC
[58] Field of Search ......... 123/1 A, 3, 32 ST, 59 EC, 123/122 A

[56] References Cited

U.S. PATENT DOCUMENTS

| | | | |
|---|---|---|---|
| 1,563,608 | 12/1925 | Wood | 123/122 A |
| 2,113,602 | 4/1938 | Pratt | 123/59 EC |
| 3,958,540 | 5/1976 | Siewert | 123/59 EC |
| 3,963,000 | 6/1976 | Kosaka et al. | 123/1 A |
| 4,004,554 | 1/1977 | Kosaka et al. | 123/DIG. 12 |

*Primary Examiner*—Charles J. Myhre
*Assistant Examiner*—Craig R. Feinberg
*Attorney, Agent, or Firm*—Lowe, King, Price & Markva

[57] ABSTRACT

A reformer for obtaining a reformed gas containing $H_2$ and/or CO from an ordinary fuel exemplified by a petroleum fuel, having a reaction chamber in the form of a combustion chamber of a compression-ignition internal combustion engine, preferably with a swirl-producing auxiliary chamber, and a piston adapted to compress the fuel usually together with air at a compression ratio ranging from about 14 to about 20 in order to initiate and sustain a reforming reaction by the heat of adiabatic compression.

15 Claims, 3 Drawing Figures

FUEL REFORMER FOR GENERATING GASEOUS FUEL CONTAINING HYDROGEN AND/OR CARBON MONOXIDE

This invention relates to an engine system including a fuel-reforming apparatus for reforming an ordinary fuel exemplified by a hydrocarbon fuel into a gaseous fuel containing large amounts of hydrogen and/or carbon monoxide by adiabatic compression of a mixture of the former fuel and an oxygen-containing gas and a combustion engine which is fed with the gaseous fuel.

It is known as a solution to the problem of the atmospheric pollution by exhaust gases of combustion engines to operate the engines with a gaseous fuel which contains as combustible components hydrogen and/or carbon monoxide and is obtained through, for example, partial oxidation or water gas reaction of an ordinary fuel typified by gasoline. A great variety of currently available fuels can be used as a starting material for producing such gaseous fuel. Examples of useful fuels are: petroleum fuels such as natural gas, LPG, gasoline, kerosene, light oil and heavy oil; synthetic fuels typified by synthetic gasoline; alcohols typified by methanol and ethanol; and nitrogen-hydrogen compounds such as ammonia and hydrazine. Even solid fuels such as coal and charcoal can be utilized.

In the following description, gasoline (octane) will be taken as a typical example of ordinary fuels to be reformed into a gaseous fuel, which is commonly called a reformed gas, containing hydrogen and/or carbon monoxide as principal combustible components, but it will be understood from the description that various liquid and gaseous fuels other than gasoline can be used in an engine system according to the invention either singularly or in combinations.

Gasoline (octane $C_8H_{18}$) undergoes partial oxidation by air as expressed by the following chemical equation:

$$C_8H_{18} + (4O_2 + 15.1N_2) \rightarrow 8CO + 9H_2 + 15.1N_2 \qquad (1)$$

This is an exothermic reaction with a reaction heat of 1.43 Kcal per 1 g of $C_8H_{18}$. This reaction heat, however, is far smaller than the reaction heat, 10.4 Kcal/g, at complete oxidation of octane. It is necessary, therefore, for the partial oxidation reaction according to Equation (1) that the reaction system be heated by a certain means in order to cause the rate of reaction to become high enough to self-sustain the reaction. For example, Jet Propulsion Laboratory (Pasadena, Calif., U.S.A.) has proposed to preheat air and gasoline at least to about 600° C and about 300° C, respectively. Heat for initiating and sustaining the partial oxidation reaction of gasoline has usually been obtained by subjecting a small quantity of gasoline to complete combustion. This means the consumption of gasoline without the generation of any useful motive power. Accordingly, an engine system including a gasoline-reforming apparatus has suffered from an increase in the specific fuel consumption. Besides, it is difficult to construct a reforming apparatus which is compact enough to serve, for example, as part of a power plant of cars because the apparatus must include bulky components for the evolution of heat, preheating of the starting materials and shielding of the heat-evolving components.

It is an object of the present invention to provide a fuel reformer which is adapted to carry out a fuel-reforming reaction of the described type and contains the following features: that the reformer is constructed compactly with the provision of no separate heat generator other than simple heat exchangers, that the reformer allows the reforming reaction to proceed efficiently and self-sustainingly and that the reformer can easily be combined with a conventional combustion engine to constitute a practicable engine system useful as a power plant of a vehicle such as an automobile.

According to the invention, a fuel reformer for carrying out a fuel-reforming reaction which gives a gaseous fuel containing as combustible components hydrogen and/or carbon monoxide from at least one fuel selected from hydrocarbon fuels, alcohols, nitrogen-hydrogen compounds and solid carbon fuels comprises the following elements: (a) a reaction chamber in the form of a combustion of a compression-ignition internal combustion engine, (b) a piston adapted to compress a gas in the reaction chamber at a compression ratio in the range from about 14 to about 20, (c) a fluid feed circuit to supply a gaseous reactant which contains at least the aforementioned fuel to the reaction chamber, and (d) a heat exchanger arranged to transfer heat from the gaseous fuel discharged from the reaction chamber to at least one component of the reactant to be supplied to the reaction chamber.

The fluid feed circuit preferably comprises a fluid mixing device adapted to prepare a gaseous mixture of either oxygen or air and the aforementioned fuel in such a proportion that the amount of oxygen in the mixture is sufficient to accomplish partial oxidation of the fuel to give the gaseous fuel but is insufficient to accomplish complete oxidation of the fuel.

The reformer preferably includes an auxiliary chamber which communicates with the reaction chamber and is located and shaped such that a portion of the reactant in the reaction chamber is squeezed into the auxiliary chamber at a last stage of a compression stroke of the piston to produce swirl.

When the reactant supplied to the reformer is a mixture of gasoline and air, the air/fuel ratio of the mixture is regulated to be within the range from 5 to 5.5 by weight.

The reformer can easily be combined with a combustion engine with the provision of a mixing device to prepare a combustible mixture of air and the gaseous fuel supplied from the reformer. In this case, a fraction of power provided by the combustion engine may be used for accomplishing compression in the reformer, and the exhaust gas of the combustion engine is passed through a heat exchanger to preheat at least one component of the reactant to be supplied to the reformer.

Other features and advantages of the invention will become apparent from the following detailed description of preferred embodiments with reference to the accompanying drawings, wherein.

Figure 1:
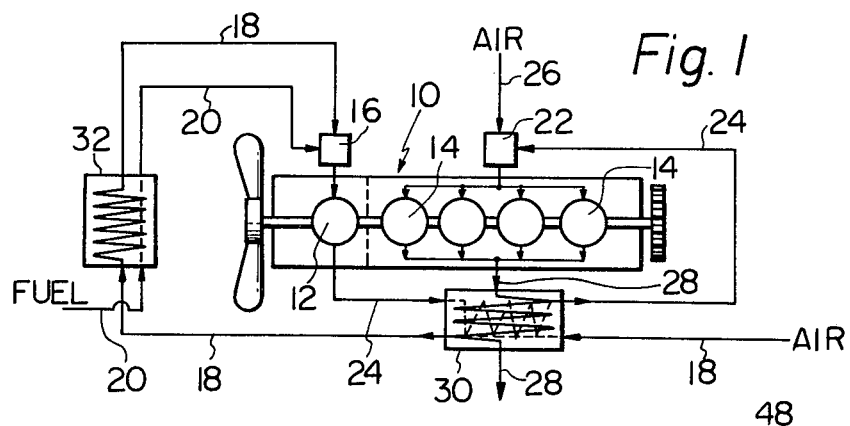
FIG. 1 is a diagrammatic presentation of a general construction of an engine system including a fuel reformer according to the invention.

An engine system of FIG. 1 has a multi-cylinder reciprocating internal combustion engine 10. A minor number of engine cylinders of this engine 10 represented by a cylinder 12 located at the extreme left is constructed to serve as a fuel reformer, and the remaining cylinders 14 are constructed in a usual manner to produce power by combustion of an air-fuel mixture. The cylinder 12 needs not to produce power. On the contrary, this cylinder 12 is usually driven by a portion of the power produced by the other cylinders 14. As an essential feature of the invention, the cylinder 12 (which will hereinafter be referred to as reformer) takes the form of an engine cylinder of a reciprocating piston diesel engine, i.e. a compression-ignition internal combustion engine in which the compression ratio is from about 14 to about 20. The power-producing cylinders 14 are fundamentally similar to engine cylinders of a conventional gasoline engine. The reformer 12 is equipped with a fluid mixing device 16. Line 18 and line 20 are arranged to supply respectively air and fuel (gasoline) to the mixing device 16 in such a proportion that the air/fuel ratio (by weight) of the air-gasoline mixture supplied from the mixing device 16 to the reformer 12 is from about 5 to about 5.5.

The power-producing cylinders 14 are equipped with a mixing device 22, and line 24 is arranged to pass a reformed gas (essentially a mixture of $H_2$, CO and $N_2$) from the reformer 12 to the mixing device 22. This mixing device 22 is regulated to prepare a combustible mixture of air admitted through line 26 and the reformed gas at such a ratio that the mixture contains air in slight excess of a stoichiometric amount in order to assure complete oxidation of CO and suppress the formation of NOx. The exhaust gas of the engine 10 (i.e. cylinders 14) is discharged from the engine system into the atmosphere through line 28. A heat exchanger 30 is provided in the line 28, and the reformed gas line 24 is arranged to serve as a part of this heat exchanger 30. The air line 18 is arranged to pass through the heat exchanger 30 so that the air may be preheated by the heat of the reformed gas and the exhaust gas without coming into direct contact with these gases. Another heat exchanger 32 is provided in the air line 18 at a section downstream of the heat exchanger 30, and the fuel line 20 is passed through the heat exchanger 32 so that the fuel may be preheated by the heat of the preheated air. As an alternative to the provision of the two heat exchangers 30 and 32 for individually heating air and gasoline, it is permissible to provide a heat exchanger (not shown in FIG. 1) between the mixing device 16 and the reformer 12 to preheat the mixture of air and gasoline. Particulars of the reformer 12 and auxiliary elements will be described hereinafter with reference to FIGS. 2 and 3.

Figure 2:
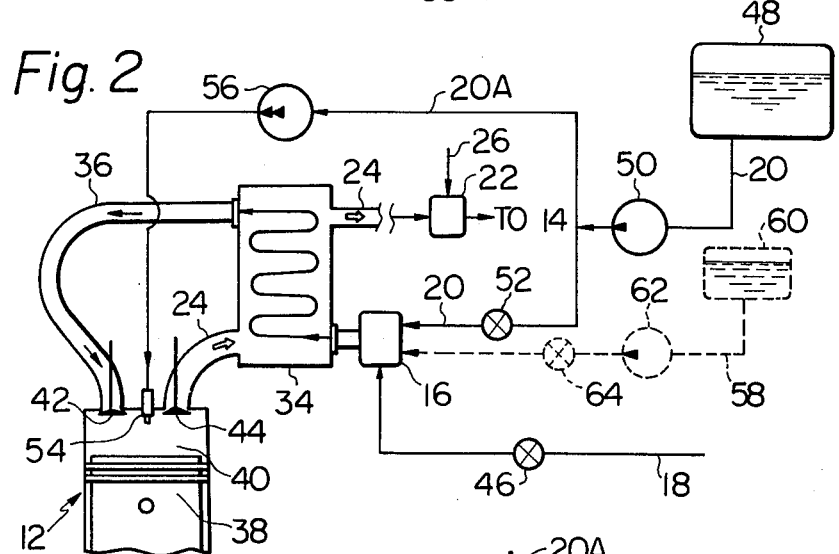
FIG. 2 is a diagrammatic presentation of a fuel reformer in a system of FIG. 1 as a preferred embodiment of the invention.

In FIG. 2, a heat exchanger 34 is provided between the mixing device 16 and the reformer 12 such that an induction passage 36 for the reformer (a diesel engine cylinder) 12 passes through this heat exchanger 34. The reformer 12 has a reciprocating piston 38 and a combustion chamber 40 defined between the top face of the piston 38 and a surface of the cylinder head (omitted from the illustration). An intake valve 42 and an exhaust valve 44 govern the communication of the combustion chamber 40 with the induction passage 36 and the reformed gas line 24, respectively. The reformed gas line 24 passes through the heat exchanger 34 to transfer heat from the reformed gas to the air-gasoline mixture flowing in the induction passage 36 without allowing the two fluids to come into direct contact with each other. Preferably, also the exhaust line 28 from the power-producing cylinders 14 is passed through this heat exchanger 34. The air line 18 includes a flow control valve 46. The fuel line 20 includes a fuel tank 48, a fluid transfer pump 50 and a flow control valve 52. An auxiliary fuel line 20A branches from the fuel line 20 at a section between the pump 50 and the valve 52 and terminates at a fuel injector 54 which is provided to the combustion chamber 40 of the reformer 12 at a location remote from the top face of the piston 38. This fuel injector 54 includes such a control mechanism (not shown) that the injection can be carried out at a controlled injection rate only when the necessity arises. The auxiliary fuel line 20A includes a pressurizing pump 56.

The engine system may have a water (or steam) line 58 which extends from a water tank 60 to the mixing device 16 and is provided with a transfer pump 62 and a flow control valve 64. The engine 10 includes a starter (not shown) which can reciprocate the piston 38 of the reformer 12.

At an initial stage of the operation, the control valve 52 in the fuel line 20 is kept closed. Air is supplied to the combustion chamber 40 of the reformer 12 through line 18, while gasoline is pressurized by the pump 56 and injected into the combustion chamber 40 from the injector 54 in a nearly stoichiometric proportion to the quantity of the supplied air. The piston 38 is made to reciprocate by the starter to compress the air-gasoline mixture in the combustion chamber 40. Since the compression ratio is as high as 14–20, the mixture is heated to a temperature above its ignition temperature by the adiabatic compression, and combustion is initiated in the combustion chamber 40. The combustion gas is passed through line 24 to heat the heat exchanger 34. The combustion under this condition is repeated until the heat exchanger 34 is heated to a sufficiently high temperature, i.e. about 500° C. Then the flow control valve 52 is opened and the injector 54 is closed. The control valves 46 and 52 are regulated such that air and gasoline is mixed in the mixing device at an air/fuel ratio (by weight) in the range from 5 to 5.5.

The air-gasoline mixture is preheated in the heat exchanger 34 to, for example, 200°–300° C and admitted into the combustion chamber 40 through the induction passage 36. The temperature of the mixture rises to about 800°–1000° C upon adiabatic compression of the mixture in the combustion chamber 40, so that the mixture undergoes the partial oxidation reaction of Equation (1). Accordingly the exhaust gas discharged from the combustion chamber 40 under this condition is a reformed gas containing $H_2$ and CO as combustible components. The reformed gas is passed through line 24 to the mixing device 22 for the power-producing cylinders 14 via the heat exchanger 34 which transfers heat from the reformed gas to the air-gasoline mixture to be fed to the reformer 12. The engine cylinders 14 are operated with a mixture of air and the reformed gas. Once combustion in the engine cylinders 14 has provided power, the piston 38 of the reformer 12 can continually be reciprocated by a fraction of the provided power.

The heat exchange between the reformed gas and either air or the air-gasoline mixture results in a temperature reduction of the reformed gas and hence contributes to the improvement of the intake efficiency of the power-producing engine cylinders 14.

According to the invention, no heating means for directly heating the combustion chamber 40 is needed. The partial oxidation or imcomplete combustion of the air-gasoline mixture can proceed self-sustainingly because of the temperature rise of the mixture to about 800°–1000° C adiabatic compression. Such high temperature is realized by merely heating the mixture to about 200°–300° C prior to the compression by the use of the heat of the reformed gas and/or the exhaust gas of an engine which is fed with the reformed gas. For example, the temperature of the mixture reaches about 900° C at the end of a compression stroke of the piston 38 if the mixture is admitted into the combustion chamber 40 at about 200° C and the compression ratio is 18. The rate of the reaction according to Equation (1) at about 500° C or above is calculated as to be on the order of millisecond based on the thermochemical data presented in "Combustion Science and Technology", Vol. 6(1973), pp.279–286. The aforementioned temperature of about 900° C, therefore, is sufficient to allow the reforming reaction to proceed self-sustainingly at a rate corresponding to a practicable speed range of an internal combustion engine which is combined with the reformer.

The air/fuel ratio of an air-fuel mixture subject to a partial oxidation reaction in the reformer 12 should be considerably lower than a stoichiometric ratio and be controlled accurately within a relatively narrow range (for example, between 5 and 5.5 with gasoline as the fuel). A higher air/fuel ratio causes complete combustion of at least a portion of the mixture, while a lower air/fuel ratio causes the reformed gas to contain soot (free carbon) and/or hydrocarbons in noticeable quantities. Also it is required that the regulated quantities of air and fuel are thoroughly mixed in the mixing device 16. In other words, the air/fuel ratio must be uniform in every region of the combustion chamber 40.

Figure 3:
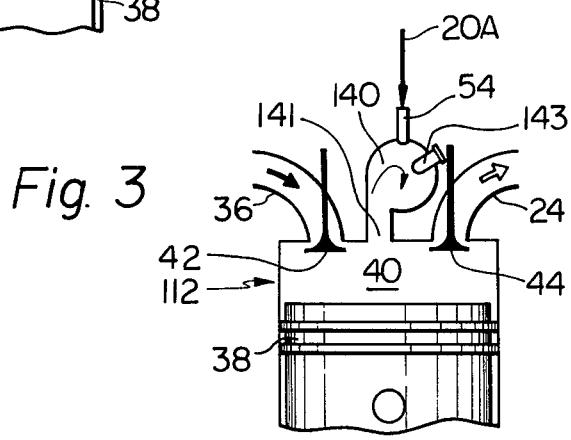
FIG. 3 is a schematic and sectional view of a slightly modified fuel reformer as another embodiment of the invention.

A reformer 112 of FIG. 3 is fundamentally similar to the reformer 12 of FIG. 2 but has an auxiliary chamber 140 in addition to the combustion chamber 40. This chamber 140 is smaller than the combustion chamber 40 and is formed in the cylinder head (not indicated) at such a location that the chamber 140 is more distant from the top face of the piston 38 than any region of the combustion chamber 40. The auxiliary chamber 140 is shaped generally spherically and communicates with the combustion chamber 40 through a very narrow passage 141 (or an entrance of a very small area). When the air-fuel mixture is compressed in the combustion chamber 40, a portion of the mixture is squeezed into the auxiliary chamber 140 at a last stage of each compression stroke and produces a violent swirl. Accordingly the air and fuel in the combustion chamber 40 can ideally be mixed with each other. In the case of FIG. 3, the fuel injector 54 is preferably located to open into the auxiliary chamber 140.

The auxiliary chamber 140 may be provided with a heater 143 so that the auxiliary chamber 140 may serve as a primary combustion chamber or ignition chamber (like a precombustion chamber in a conventional diesel engine of a certain type) when the fuel is supplied from the injector 54 at an initial stage of the operation. It is possible to continue the heating of the auxiliary chamber with the heater 143 even when the reforming reaction takes place in the reformer 112 in order to utilize the auxiliary chamber 140 not only as a swirl chamber but also as a hot-bulb, which aids the reforming reaction in its initiation and rapid progress.

Water or steam may be added to the air-fuel mixture in the mixing device 16 by means of the water line 58 with respect to either of the reformer 12 of FIG. 2 or the reformer 112 of FIG. 3. The addition of water or steam effectively contributes to the suppression of generation of soot in the partial oxidation reaction. It is possible to separate steam from the exhaust gas of the power-producing cylinders 14 and supply the separated steam to the mixing device 16.

Also it is permissible to provide a catalyst (not shown) in the auxiliary chamber 140 to promote the reforming reaction.

As will have been understood from the foregoing description, a commercial and inexpensive diesel engine can be utilized as the reformer 12 or 112 according to the invention without need of including a large-sized and complicated heat-evolving apparatus. Nevertheless, a reforming reaction in the reformer 12 or 112 proceeds stably and self-sustainingly. Accordingly, a reformer according to the invention can easily be combined with a conventional engine to constitute an engine system which is compact, efficient and ready to use in vehicles such as automobiles.

It will be understood that the partial oxidation in the reformer 12 or 112 can be carried out by the use of oxygen in place of air. As an easily practicable technique, oxygen for this purpose can be obtained by catalytic decomposition of an aqueous solution of hydrogen peroxide.

A reformer according to the invention does not necessarily consist of a single engine cylinder of a diesel engine. A multi-cylinder diesel engine (of either the reciprocating type or rotary type) may entirely be used as a reformer. In such a case, the reformer can provide some power simultaneously with the production of a reformed gas.

What is claimed is:

1. A fuel reformer for carrying out a fuel-reforming reaction which gives a gaseous fuel containing as combustible components at least one of hydrogen and carbon monoxide through partial oxidation of at least one fuel selected from hydrocarbon fuels, alcohols, and nitrogen-hydrogen compounds without using any catalyst, the reformer comprising:

a single reaction chamber in the form of a combustion chamber of a compression-ignition internal combustion engine;

a piston adapted to compress a gas in said reaction chamber at a compression ratio in the range from about 14 to about 20;

a heat exchanger arranged to transfer heat from the reaction product discharged from said reaction chamber to at least one component of a gaseous mixture to be supplied to said reaction chamber;

a fluid feed means for selectively supplying to said reaction chamber either an oxygen-containing gas selected from the group consisting of oxygen and air when said heat exchanger is too cold to support said fuel-reforming reaction or said gaseous mixture comprising said at least one fuel and said oxygen-containing gas when said heat exchanger is sufficiently hot enough to support said fuel-reforming reaction, the amount of oxygen in said gaseous mixture being sufficient to accomplish partial oxidation but insufficient to accomplish complete oxidation of said at least one fuel in said gaseous mixture; and a fuel injection means for pressurizing said at least one fuel and injecting the pressurized fuel into said reaction chamber only when said fluid feed means supplies said oxygen-containing gas alone to said reaction chamber in such a quantity that the injected fuel undergoes a complete oxidation.

2. A fuel reformer as claimed in claim 1, further comprising a fluid feed means for introducing water into said gaseous mixture.

3. A fuel reformer as claimed in claim 1, wherein said at least one fuel and said oxygen-containing gas are gasoline and air, respectively, said fluid feed means being regulated such that the air/fuel ratio of said mixture is in the range from 5 to 5.5 by weight.

4. A fuel reformer as claimed in claim 3, wherein said heat exchanger is constructed such that said gaseous mixture is admitted into said reaction chamber at temperatures between about 200° C. and about 300° C., said compression ratio being determined such that said gaseous mixture is heated to about 800°–1000° C. by the compression in said reaction chamber.

5. A fuel reformer as claimed in claim 1, further comprising an auxiliary chamber which communicates with said reaction chamber and is located and shaped such that a portion of said gaseous reactant supplied to said reaction chamber is squeezed into said auxiliary chamber and produces swirl at a last stage of a compression stroke of said piston.

6. A fuel reformer as claimed in claim 5, further comprising a catalyst contained in said auxiliary chamber for promoting said fuel-reforming reaction.

7. A fuel reformer as claimed in claim 5, further comprising means for pressurizing said at least one fuel and injecting the pressurized fuel into said auxiliary chamber.

8. A fuel reformer as claimed in claim 7, further comprising a heater arranged to heat the interior of said auxiliary chamber.

9. An engine system comprising:
a fuel reformer which is adapted to carry out a fuel-reforming reaction to give a gaseous fuel containing as combustible components at least one of hydrogen and carbon monoxide through partial oxidation of at least one fuel selected from hydrocarbon fuels, alcohols, and nitrogen-hydrogen compounds without using any catalyst and includes a single reaction chamber in the form of a combustion chamber of a compression-ignition internal combustion engine, a piston adapted to compress a gas in said reaction chamber at a compression ratio in the range from about 14 to about 20x; at least one heat exchanger arranged to accomplish heat exchange between the exhaust gas of said combustion engine and at least one component of a gaseous reactant to be supplied to said reaction chamber; a fluid feed means for selectively supplying to said reaction chamber either an oxygen-containing gas selected from the group consisting of oxygen and air when said heat exchanger is too cold to support said fuel-reforming reaction or said gaseous mixture comprising said at least one fuel and said oxygen-containing gas when said heat exchanger is sufficiently hot enough to support said fuel-reforming reaction, the amount of oxygen in said gaseous mixture being sufficient to accomplish complete oxidation of said at least one fuel in said gaseous mixture, a fuel injection means for pressurizing said at least one fuel and injecting the pressurized fuel into said reaction chamber only when said fluid feed means supplies said oxygen-containing gas alone to said reaction chamber in such a quantity that the injected fuel undergoes a complete oxidation;

a combustion engine adapted to produce power; and
means for preparing a combustible mixture of air and said gaseous fuel supplied from said fuel reformer and supplying the prepared combustible mixture to said combustion engine.

10. An engine system as claimed in claim 9, wherein said reformer and said combustion engine are integrated to constitute a multi-cylinder internal combustion engine, a minor number of engine cylinders of said multi-cylinder internal combustion engine being adapted to serve as said fuel reformer, the remaining engine cylinders being operated with said combustible mixture to provide power.

11. An engine system as claimed in claim 9, wherein said reformer and said combustion engine are mechanically combined with each other such that a fraction of power provided by said combustion engine is used to accomplish compression in said reformer.

12. An engine system as claimed in claim 9, wherein said at least one fuel and said oxygen-containing gas being gasoline and air, respectively, said fluid feed means being regulated such that the air/fuel ratio of said mixture is in the range from 5 to 5.5 by weight.

13. A fuel reformer as claimed in claim 12, wherein said heat exchanger is constructed such that said gaseous mixture is admitted into said reaction chamber at temperatures between about 200° C. and about 300° C., said compression ratio being determined such that said gaseous mixture is heated to about 800°–1000° C. by the compression in said reaction chamber.

14. An engine system as claimed in claim 12, wherein said at least one heat exchanger is arranged such that said exhaust gas transfers heat thereof to said mixture of gasoline and air.

15. An engine system as claimed in claim 14, wherein said at least one heat exchanger is arranged such that also said gaseous fuel transfers heat thereof to said mixture of gasoline and air in said at least one heat exchanger.

* * * * *